United States Patent [19]

Eppley et al.

[11] Patent Number: 4,869,975

[45] Date of Patent: Sep. 26, 1989

[54] OVERVOLTAGE CONTROL CIRCUIT FOR A RESERVE BATTERY

[75] Inventors: William J. Eppley, Skippack; Walter T. Pertuch, Conshohocken; Bernard C. Tierney, Doylestown, all of Pa.

[73] Assignee: Honeywell Inc., Minneapolis, Minn.

[21] Appl. No.: 240,295

[22] Filed: Sep. 6, 1988

[51] Int. Cl.$^4$ .............................................. H01M 2/00
[52] U.S. Cl. .......................................... 429/7; 429/50; 429/122
[58] Field of Search .................. 429/7, 50, 122, 61, 429/92, 93; 320/49, 2

[56] References Cited

U.S. PATENT DOCUMENTS

| | | | |
|---|---|---|---|
| 2,876,271 | 3/1959 | Cahoon | 429/7 X |
| 4,217,400 | 8/1980 | Leffingwell | 429/7 |
| 4,315,364 | 2/1982 | Leffingwell | 429/7 X |
| 4,431,713 | 2/1984 | Fehling et al. | 429/7 |
| 4,680,527 | 7/1987 | Benenati et al. | 429/7 X |

Primary Examiner—Anthony Skapars
Attorney, Agent, or Firm—Mitchell J. Halista; Charles G. Mersereau; Albin Medved

[57] ABSTRACT

An overvoltage control circuit for a reserve battery includes a current limiting resistor connected in series with a thermal-lag type circuit interrupter such as a thermal-lag fuse or circuit breaker. The series combination is connected across a selectively activatable reserve battery which is connected across an electrical load to be energized by the battery. A high current drain through the circuit interrupter and the resistor during an initial activation of the reserve battery is effective to stabilize the output voltage of the battery at a level below a desired working limit of battery potential without an overshoot of the working limit. Subsequently, the current drain operates the circuit interrupter to isolate the limiting resistor to interrupt the current drain and allow the battery output to reach a level approximating the working limit.

6 Claims, 1 Drawing Sheet

OVERVOLTAGE CONTROL CIRCUIT FOR A RESERVE BATTERY

BACKGROUND OF THE INVENTION

Field of the Invention

The present invention relates to reserve batteries. More specifically, the present invention is directed to overvoltage protection for a reserve battery.

SUMMARY OF THE INVENTION

An object of the present invention is to provide an improved overvoltage control circuit for a reserve battery.

In accomplishing this and other objects, there has been provided, in accordance with the present invention, a voltage control circuit for a reserve battery including a series combination of a current limiting resistor and a thermal-lag circuit interrupter connected across a selectively activatable reserve battery used to energize associated electrical equipment.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
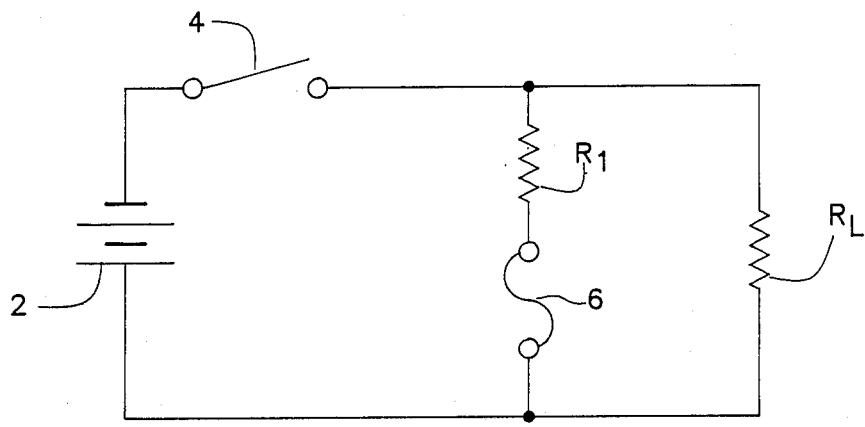
FIG. 1 is a schematic illustration of a reserve battery voltage control circuit embodying the present invention and FIG. 2 is a graphical illustration of the operation of the circuit shown in FIG. 1.

Referring to FIG. 1 in more detail, there is shown a reserve battery voltage control circuit for a reserve battery 2. The reserve battery 2 can be selectively activated to function as a power source for associated electronic equipment which is represented by resistor $R_L$. A switch means 4 is shown as a representation of any suitable means for selectively activating the reserve battery 2. Such reserve batteries 2 are well-known in the art as shown in U.S. Pat. No. 4,119,038.

Reserve batteries, particularly those using a lithium chemistry, when activated produce an initial output voltage higher than a desired maximum working voltage. In applications where such a voltage overshoot would be unacceptable since it might produce damage to associated electrical equipment being powered by the reserve battery, it is necessary to limit the output voltage of the activated reserve battery to a maximum or working voltage level compatible with the associated electrical equipment. In order to prevent such an overshoot of a reserve battery output voltage upon an activation of a reserve battery, the present invention uses a current limiting resistor $R_1$ connected in series with a delayed actuation circuit interrupter 6, e.g., a thermal lag fuse or circuit breaker. Such a fuse or circuit breaker 6 would enable a current to flow through the current limiting resistor $R_1$ for a period of time even though the current substantially exceeded the current rating of the fuse 6. After the time interval as determined by the fuse 6, e.g., 13 seconds, the fuse 6 would open to interrupt the current drain from the battery 2 through the resistor $R_1$. Such an operation is effective to prevent the initial voltage overshoot of the battery 2 by imposing a high current load, i.e., a high energy dissipation, on the battery 2 during its initial operation. During the initial current drain time, the reserve battery 2 would stabilize by a reaction of the electrolyte solution with lithium anode surface to produce a gradually increasing voltage output which was at all times within the working voltage limit for the associated electrical equipment. After the opening of fuse 6, the voltage of the battery 2 would continue to increase to approximate, without overshoot, the desired maximum working voltage.

Figure 2:
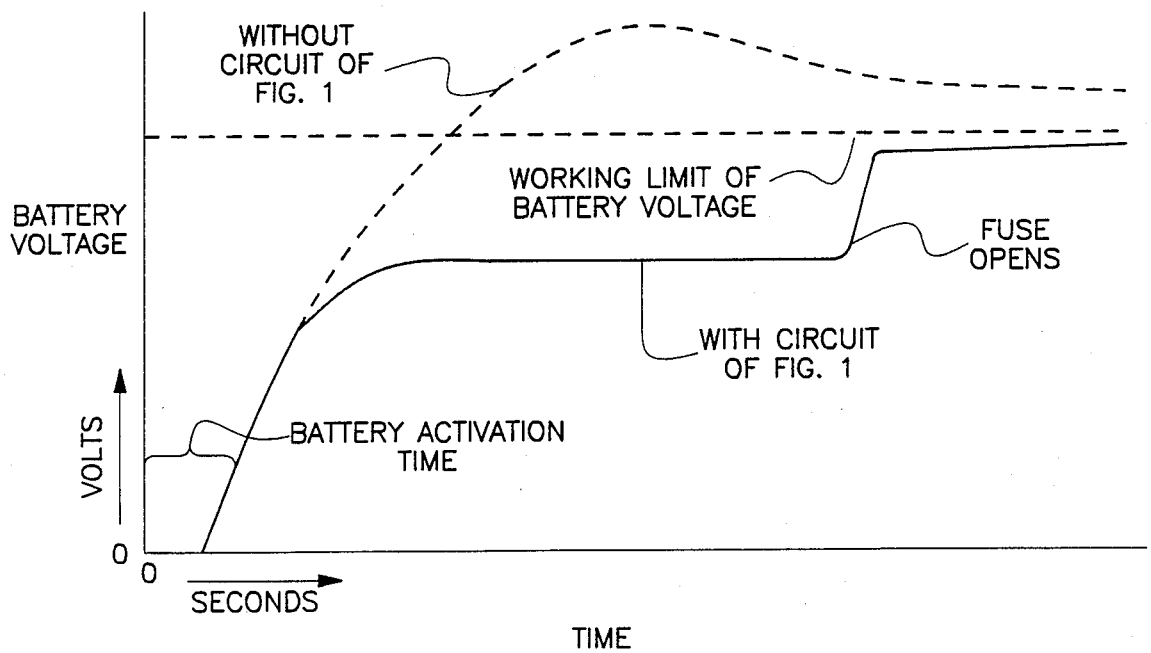

In FIG. 2, there is shown a graphical representation of the operation of the control circuit shown in FIG. 1 with the dashed line showing the overshoot of the battery output voltage following an activation of the battery 2 without the protection afforded by the control circuit of FIG. 1. Thus, as may be seen from FIG. 2, the initial output voltage from the reserve battery 2 after an initial battery activation time rises to a level which is determined by the high current drain, e.g., 15 amps, through the current limiting resistor $R_1$. After a suitable current drain time, the fuse 6 is arranged to open. At this time, the battery output voltage rises further to a level approximating without overshoot the desired battery voltage limit. Thus, the voltage overshoot produced without the control circuit of FIG. 1 is avoided. Accordingly, for electronic equipment requiring a supply voltage having a narrow band of permissible voltage deviation, the circuit of FIG. 1 is effective to control the battery voltage within the desired limits. Further, inasmuch as the control circuit of the present invention relys on passive circuit elements and does not employ any active voltage regulator elements, e.g., transistors, it is inherently hardened for nuclear exposure. The use of passive elements is also effective to produce a lower manufacturing and packaging cost while providing the voltage limiting function with no significant loss of battery capacity.

Accordingly, it may be seen that there has been provided, in accordance with the present invention, an improved reserve battery overvoltage control circuit.

The embodiments of the present invention in which an exclusive property or privilege is claimed are defined as follows:

1. A selectively activatable reserve battery overvoltage control circuit comprising
    a current limiting resistor,
    a thermal-lag circuit interrupter connected in series with said resistor and
    circuit means connecting said series connection of said resistor and said interrupter across the reserve battery.

2. A control circuit as set forth in claim 1 wherein said interrupter is a thermal-lag fuse.

3. A control circuit as set forth in claim 1 wherein said interrupter is a thermal-lag circuit breaker.

4. A method of controlling an initial voltage rise of a reserve battery following an activation of the battery including the steps of subjecting the activated battery to a battery output voltage rise limiting current drain independent of current drawn by electrical equipment energized by the activated battery during a predetermined period of time following the activation of the battery and interrupting the current drain after the period of time to allow a further rise in the battery output voltage to approximate a desired battery voltage working limit within an overshoot of the working limit.

5. A method as set forth in claim 4 wherein the period of time is approximately thirteen seconds.

6. A method as set forth in claim 5 wherein the battery is a lithium battery and the current drain is approximately fifteen amperes.

* * * * *